April 14, 1953     J. F. GRAYSON     2,634,474
OFF-CENTER LOCK
Filed June 21, 1951
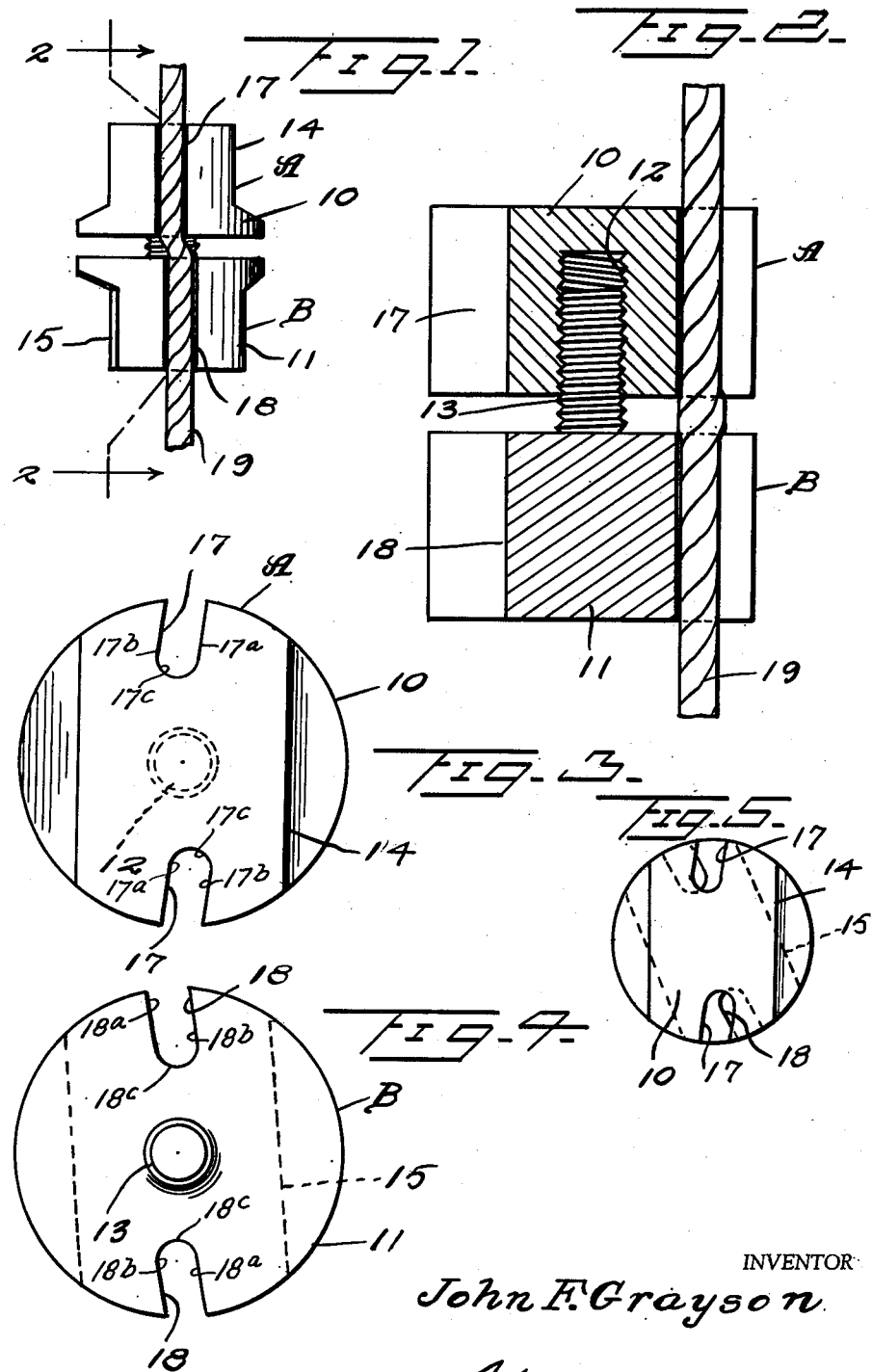
INVENTOR
John F. Grayson
BY *Kimmel & Crowell*
ATTORNEYS

Patented Apr. 14, 1953

2,634,474

UNITED STATES PATENT OFFICE 2,634,474

OFF-CENTER LOCK

John F. Grayson, San Diego, Calif.

Application June 21, 1951, Serial No. 232,853

2 Claims. (Cl. 24—125)

This invention relates to an off-center lock, and more particularly to such a lock for clamping a cable, rope or rod in a desired position.

A primary object of the invention is the provision of an improved two-part device adapted to be applied to one or more strands of a cable or a rope to one or more rods for securing the same against slippage or disengagement.

A further object of the invention is the provision of a lock of this nature characterized by two interengageable parts, each provided with longitudinally extending bores or slots, preferably the latter, the arrangement being such that the bores are located off-center relative to each other, whereby upon relative rotation of the parts, a clamping effect on any object inserted in the slots may be effected.

Still another object of the invention is the provision of a clamping or locking device of this character which is sturdy and durable in construction, reliable and efficient in operation, not subject to slippage and inexpensive to manufacture, assemble and utilize.

Other objects will in part be obvious and in part be pointed out as the description of the invention proceeds and shown in the accompanying drawings wherein there is disclosed a preferred form of this inventive concept.

In the drawings:

Fig. 1 is a side elevational view of one form of device embodying features of the instant invention;

Fig. 2 is an enlarged sectional view taken substantially along the line 2—2 of Fig. 1 as viewed in the direction indicated by the arrows;

Fig. 3 is a top plan view of one of the component parts of the device;

Fig. 4 is a similar view of the other component part; and

Fig. 5 is a top plan view showing the assembled device in clamping or locking position.

Similar reference characters refer to similar parts throughout the several views of the drawings.

Referring now to the drawings in detail, it will be seen that the device is comprised of two generally cylindrical members 10 and 11, respectively. The member 10 is provided with an interiorly threaded recess 12 adapted for threaded engagement with a stud 13 carried by the member 11. Each member is provided with a pair of oppositely disposed flats 14 and 15, respectively, to permit the device to be readily engaged by a tool such as a wrench or the like. The member 10 is provided with a pair of oppositely disposed slots 17 extending longitudinally therethrough, it being noted that the angle of inclination of the slots is off-set relative to the radius of the member 10, these slots being inclined relative to the radius of the device in one direction.

Member 11 is provided with a corresponding pair of off-center angularly disposed slots 18 extending longitudinally therethrough, it being pointed out that when the device is in assembled position, the inclination of the slots relative to each other is such that when in alignment a rope, cable or rod 19 may be inserted readily in the slot but when the component parts of the device are rotated relative to each other a clamping action is effected.

This clamping action is effected as follows— each of the slots 17 has a parallel side 17a and 17b and a symmetrical semi-circular bight 17c, the sides 17a referred to as the inner sides of each slot 17 being radially disposed relative to member 10 and in radial alignment, and the sides 17b referred to as the outer sides, being oppositely disposed, one on one side of the radial line of sides 17a and the other on the other side. The bights 17c of each slot are thus oppositely disposed on opposite sides of and equidistant from a diametric line through the center of member 10. Similarly each of the slots 18 has parallel sides 18a and 18b and a symmetrical semi-circular bight 18c, the sides 18a referred to as the inner sides of each slot 18 being radially disposed relative to member 10 and in radial alignment, and the sides 18b referred to as the outer sides being oppositely disposed, one on one side of the radial line of sides 18a and the other on the other side. The bights 18c of each slot are thus oppositely disposed on opposite sides of and equidistant from a diametric line through the center of member 10.

However, when members 10 and 11 are in coacting relation, the outer sides 17b are oppositely disposed relative to corresponding outer sides 18b so that at no time are the slots in perfect registry with their inner and outer sides parallel. As shown in Figure 5, when bight portions 17c and 18c are in registry sides 17a and 17b are disposed at an acute angle relative to corresponding sides 18a and 18b, the side of the angle increasing as the degree of registry of the bights is decreased progressively to decrease the size of the registry portion of the slots and effect a clamping action.

Obviously, a single strand of cable or a single rod may be clamped, as shown in Fig. 2, or as many additional strands of cable or as many additional rods as there are slots may be held against slippage or disengagement.

Additional embodiments may be made of this inventive concept, and additional modifications may be made in the embodiment hereinbefore shown and set forth; for example, the slots may be one or more, as few or as many as desired. It is to be understood that all matter herein is to be interpreted merely as illustrative and not in a limiting sense.

What is claimed is:

1. In a device of the character described, an internally threaded circular member, and a member of corresponding diameter having an externally threaded circular projection engageable in coaxial relation therewith, each of said members having a parallel sided slot therein, the slots being coextensive, each slot having a radially disposed inner side and a radially offset outer side and a bight portion between the inner and outer sides, the outer side of the slot of one member being oppositely disposed from a diametric line through the centers of said members, relative to the outer side of the slot of the other member, said bight portions thus being offset relative to a diametric line and hence to each other whereby when said bight portions are in registry said inner and outer sides of one slot are angularly disposed relative to the inner and outer sides of the other slot and rotation of said members relative to each other will increase the angle of offset of said sides and decrease the area of registry of said bight portion to effect a clamping action on an article inserted through said bight portion.

2. In a device of the character described, an internally threaded circular member, and a member of corresponding diameter having an externally threaded circular projection engageable in coaxial relation therewith, each of said members having pairs of oppositely disposed parallel sided slots therein, the slots being coextensive, each slot having a radially disposed inner side and a radially offset outer side and a bight portion between the inner and outer sides, the outer sides of the slots of one member being oppositely disposed from a diametric line through the centers of said members, relative to the outer sides of the slots of the other member and the outer sides of each pair of slots being oppositely disposed relative to each other, said bight portions thus being offset relative to a diametric line and hence to each other whereby when said bight portions are in registry said inner and outer sides of one slot are angularly disposed relative to the inner and outer sides of the other slot and rotation of said members relative to each other will increase the angle of offset of said sides and decrease the area of registry of said bight portion to effect clamping action on an article inserted through said bight portion.

JOHN F. GRAYSON.

References Cited in the file of this patent

UNITED STATES PATENTS

| Number | Name | Date |
|---|---|---|
| 501,485 | Ball | July 18, 1893 |
| 1,997,430 | Peirce | Apr. 9, 1935 |
| 2,565,605 | Grayson | Aug. 28, 1951 |

FOREIGN PATENTS

| Number | Country | Date |
|---|---|---|
| 610,301 | France | Sept. 3, 1926 |